United States Patent
Nagaoka et al.

(10) Patent No.: US 10,242,801 B2
(45) Date of Patent: Mar. 26, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Chuo-ku, Tokyo (JP)

(72) Inventors: Kunihiko Nagaoka, Takasaki (JP); Tomoaki Nakamura, Takasaki (JP); Noriyuki Chigira, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/705,044

(22) Filed: Sep. 14, 2017

(65) Prior Publication Data

US 2018/0090272 A1    Mar. 29, 2018

(30) Foreign Application Priority Data

Sep. 27, 2016 (JP) ................. 2016-188520

(51) Int. Cl.
| | |
|---|---|
| *H01G 4/30* | (2006.01) |
| *H01G 4/12* | (2006.01) |
| *H01G 4/232* | (2006.01) |
| *H01G 4/33* | (2006.01) |

(Continued)

(52) U.S. Cl.
CPC .......... *H01G 4/1227* (2013.01); *H01G 4/232* (2013.01); *H01G 4/33* (2013.01); *H01G 4/012* (2013.01); *H01G 4/248* (2013.01)

(58) Field of Classification Search
CPC ....................................................... H01G 4/30
See application file for complete search history.

(56) References Cited

U.S. PATENT DOCUMENTS

| | | | |
|---|---|---|---|
| 8,867,188 B2 | 10/2014 | Kim et al. | |
| 2009/0067117 A1* | 3/2009 | Kasuya | H01G 4/005 361/321.2 |
| 2010/0289187 A1 | 11/2010 | Bae et al. | |

(Continued)

FOREIGN PATENT DOCUMENTS

| | | |
|---|---|---|
| JP | 2002043164 A | 2/2002 |
| JP | 2002289456 A | 10/2002 |

(Continued)

*Primary Examiner* — Eric W Thomas
(74) *Attorney, Agent, or Firm* — Law Office of Katsuhiro Arai

(57) ABSTRACT

A multilayer ceramic capacitor includes: a first and a second external electrodes; internal electrode layers that are alternately connected to the first and the second external electrodes; and dielectric layers including a ceramic material as a main component, wherein a D20% diameter of the ceramic material of an end margin region, in which internal electrode layers connected to one of the first external electrode and the second external electrode face with each other and does not face with internal electrode layers connected to the other, is smaller than that of a capacity region in which internal electrode layers connected to different external electrodes face with each other and a D80% diameter of the ceramic material of the end margin region is larger than that of the capacity region, or 1/(log D80−log D20) of the ceramic material of the capacity region is larger than that of the end margin region.

16 Claims, 5 Drawing Sheets

(51) Int. Cl.
   *H01G 4/248*   (2006.01)
   *H01G 4/012*   (2006.01)

(56) References Cited

U.S. PATENT DOCUMENTS

| | | |
|---|---|---|
| 2012/0154978 A1 | 6/2012 | Kim |
| 2012/0262840 A1* | 10/2012 | Koizumi .............. H01G 4/1209 361/321.2 |
| 2014/0301015 A1* | 10/2014 | Kim ........................ H01G 4/30 361/301.4 |

FOREIGN PATENT DOCUMENTS

| | | |
|---|---|---|
| JP | 2005039068 A | 2/2005 |
| JP | 2012129494 A | 7/2012 |
| KR | 20100123421 A | 11/2010 |

* cited by examiner

FIG. 5

| | AVERAGE GRAIN DIAMETER OF CAPACITY REGION BEFORE BAKING (μm) | CAPACITY REGION | | | | END MARGIN REGION | | | | GRAIN SIZE DISTRIBUTION | DIFFERENCE OF AVERAGE GRAIN DIAMETER (%) | DELAMINATION DEFECT | CRACK DEFECT |
|---|---|---|---|---|---|---|---|---|---|---|---|---|---|
| | | D20% (μm) | D50% (μm) | D80% (μm) | 1/(log(80%)−log(20%)) | D20% (μm) | D50% (μm) | D80% (μm) | 1/(log(80%)−log(20%)) | | | | |
| EXAMPLE 1 | 0.1 | 0.08 | 0.11 | 0.13 | 4.74 | 0.05 | 0.11 | 0.17 | 1.88 | ○ | 0.00% | 0/200 | 0/200 |
| EXAMPLE 2 | 0.1 | 0.19 | 0.25 | 0.33 | 4.17 | 0.13 | 0.23 | 0.36 | 2.26 | ○ | −8.70% | 1/200 | 1/200 |
| EXAMPLE 3 | 0.15 | 0.12 | 0.15 | 0.18 | 5.68 | 0.10 | 0.15 | 0.20 | 3.32 | ○ | 0.00% | 0/200 | 0/200 |
| EXAMPLE 4 | 0.2 | 0.17 | 0.21 | 0.27 | 4.98 | 0.12 | 0.21 | 0.35 | 2.15 | ○ | 0.00% | 1/200 | 0/200 |
| EXAMPLE 5 | 0.1 | 0.08 | 0.11 | 0.14 | 4.11 | 0.06 | 0.11 | 0.18 | 2.10 | ○ | 0.00% | 0/200 | 0/200 |
| EXAMPLE 6 | 0.1 | 0.08 | 0.10 | 0.13 | 4.74 | 0.07 | 0.10 | 0.17 | 2.60 | ○ | 0.00% | 0/200 | 0/200 |
| EXAMPLE 7 | 0.1 | 0.08 | 0.10 | 0.13 | 4.74 | 0.07 | 0.11 | 0.18 | 2.44 | ○ | 9.09% | 0/200 | 0/200 |
| EXAMPLE 8 | 0.1 | 0.08 | 0.12 | 0.14 | 4.11 | 0.07 | 0.12 | 0.18 | 2.44 | ○ | 0.00% | 0/200 | 0/200 |
| COMPARATIVE EXAMPLE 1 | 0.1 | 0.08 | 0.11 | 0.13 | 4.74 | 0.08 | 0.11 | 0.12 | 5.68 | × | 0.00% | 11/200 | 18/200 |
| COMPARATIVE EXAMPLE 2 | 0.2 | 0.17 | 0.21 | 0.27 | 4.98 | 0.17 | 0.21 | 0.27 | 4.98 | × | 0.00% | 15/200 | 29/200 |
| COMPARATIVE EXAMPLE 3 | 0.1 | 0.07 | 0.10 | 0.20 | 2.19 | 0.08 | 0.11 | 0.13 | 4.74 | × | 9.09% | 6/200 | 16/200 |
| COMPARATIVE EXAMPLE 4 | 0.1 | 0.08 | 0.11 | 0.14 | 4.11 | 0.09 | 0.11 | 0.12 | 8.00 | × | 0.00% | 3/200 | 3/200 |
| COMPARATIVE EXAMPLE 5 | 0.1 | 0.08 | 0.12 | 0.14 | 4.11 | 0.10 | 0.12 | 0.13 | 8.78 | × | 0.00% | 3/200 | 5/200 |
| COMPARATIVE EXAMPLE 6 | 0.1 | 0.12 | 0.15 | 0.18 | 5.68 | 0.13 | 0.15 | 0.18 | 7.08 | × | 0.00% | 4/200 | 4/200 |

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2016-188520, filed on Sep. 27, 2016, the entire contents of which are incorporated herein by reference.

FIELD

A certain aspect of the present invention relates to a multilayer ceramic capacitor and a manufacturing method of a multilayer ceramic capacitor.

BACKGROUND

It is necessary to reduce a thickness of dielectric layers and increase stack number of the dielectric layers for large capacity of a multilayer ceramic capacitor of small size and large capacity type. However, when the stack number is increased, a structure defect such as a delamination or a crack tends to occur and reliability may be degraded. Therefore, a technology for suppressing the delamination and the crack is demanded even if the stack number is increased (for example, see Japanese Patent Application Publications No. 2005-39068, No. 2002-289456 and No. 2012-129494).

SUMMARY OF THE INVENTION

However, with the technology, a difference of average crystal grain diameters of ceramic materials between a region in which internal electrodes connected to different external electrodes face with each other and the other region is enlarged. And there is a difference between mechanical strengths of the regions. Thereby, it may be difficult to sufficiently suppress the structure defect such as the delamination and the crack.

It is an object to provide a multilayer ceramic capacitor and a manufacturing method of the same that are capable of suppressing a structure defect such as a delamination or a crack.

According to an aspect of the present invention, there is provided a multilayer ceramic capacitor including: a first external electrode and a second external electrode; a plurality of internal electrode layers that are alternately connected to the first external electrode and the second external electrode and are stacked; and a plurality of dielectric layers each of which is arranged between the plurality of internal electrode layers, the plurality of dielectric layers including a ceramic material as a main component, wherein a D20% diameter of the ceramic material of an end margin region, in which internal electrode layers connected to one of the first external electrode and the second external electrode face with each other and does not face with internal electrode layers connected to the other, is smaller than another D20% diameter of the ceramic material of a capacity region in which internal electrode layers connected to different external electrodes face with each other and a D80% diameter of the ceramic material of the end margin region is larger than another D80% diameter of the ceramic material of the capacity region, or 1/(log D80−log D20) of the ceramic material of the capacity region is larger than 1/(log D80−log D20) of the ceramic material of the end margin region.

According another aspect of the present invention, there is provided a manufacturing method of a multilayer ceramic capacitor including: providing a metal conductive paste on a green sheet including first ceramic grains; forming a layer unit by providing second ceramic grains on a peripheral area around the metal conductive paste on the green sheet; baking a multilayer structure that is formed by stacking the layer unit, wherein a grain diameter of the second ceramic grains is adjusted so that, in the multilayer structure, a D20% diameter of the first ceramic grains and the second ceramic grains of the peripheral area is smaller than another D20% diameter of the first ceramic grains between a pair of the metal conductive paste and a D80% diameter of the first ceramic grains and the second ceramic grains of the peripheral area is larger than another D80% diameter of the first ceramic gains between the pair of the metal conductive paste, or 1/(log D80−log D20) of the first ceramic grains between the pair of the metal conductive paste is larger than 1/(log D80−log D20) of the first ceramic grains and the second ceramic grains of the peripheral area.

BRIEF DESCRIPTION OF THE DRAWINGS

FIG. 5 illustrates results of examples and comparative examples.

DETAILED DESCRIPTION

A description will be given of an embodiment with reference to the accompanying drawings.

Embodiment

Figure 1:
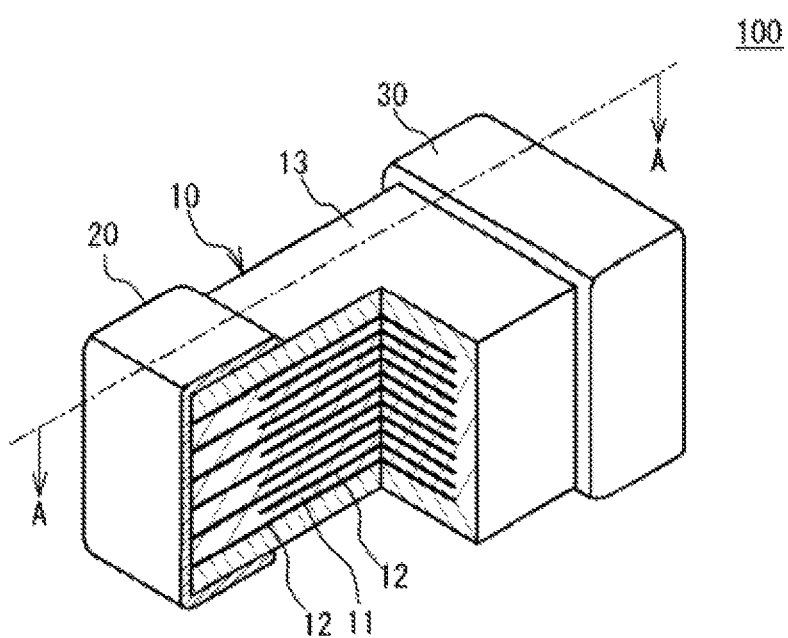
FIG. 1 illustrates a partially cross-sectioned perspective view of a multilayer ceramic capacitor.

A description will be given of a multilayer ceramic capacitor. FIG. 1 illustrates a partially cross-sectioned perspective view of a multilayer ceramic capacitor 100. As illustrated in FIG. 1, the multilayer ceramic capacitor 100 includes a multilayer chip 10 having a rectangular parallelepiped shape, and a pair of external electrodes 20 and 30 that are provided at edge faces of the multilayer chip 10 facing each other.

The multilayer chip 10 has a structure designed to have dielectric layers 11 and internal electrode layers 12 alternately stacked. The dielectric layers 11 include ceramic material acting as a dielectric material. The internal electrode layers 12 include a base metal. End edges of the internal electrode layers 12 are alternately exposed to a first end face of the multilayer chip 10 and a second end face of the multilayer chip 10 that is different from the first end face. In the embodiment, the first face faces with the second face. The external electrode 20 is provided on the first end face. The external electrode 30 is provided on the second end face. Thus, the internal electrode layers 12 are alternately conducted to the external electrode 20 and the external electrode 30. Thus, the multilayer ceramic capacitor 100 has a structure in which a plurality of dielectric layers 11 are stacked and each two of the dielectric layers 11 sandwich the internal electrode layer 12. In the multilayer chip 10, both end faces in the stack direction of the dielectric layers 11 and the internal electrode layers 12 (hereinafter referred to as stack direction) are covered by cover layers 13. For example, material of the cover layer 13 is the same as that of the dielectric layer 11.

For example, the multilayer ceramic capacitor 100 may have a length of 0.2 mm, a width of 0.1 mm and a height of 0.3 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the external electrodes 20 and 30 and the internal electrode layers 12 is a base metal such as nickel (Ni), copper (Cu), tin (Sn) or the like. The external electrodes 20 and 30 and the internal electrode layers 12 may be made of noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
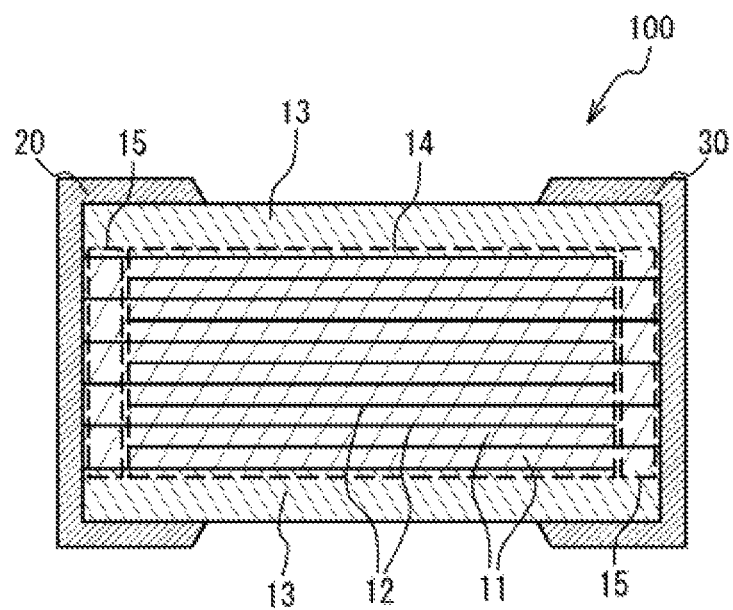
FIG. 2 illustrates a cross sectional view taken along a lime A-A of FIG. 1.

FIG. 2 illustrates a cross sectional view taken along a line A-A of FIG. 1. As illustrated in FIG. 2, in a capacity region 14, a set of the internal electrode layers 12 connected to the external electrode 20 face another set of the internal electrode layers 12 connected to the external electrode 30. That is, in the capacity region 14, two internal electrode layers 12 that are next to each other and are connected to different external electrodes face each other. In an end margin region 15, the internal electrode layers 12 connected to the external electrode 20 face each other without sandwiching the internal electrode layer 12 connected to the external electrode 30. A region in which the internal electrode layers 12 connected to the external electrode 30 face each other without sandwiching the internal electrode layer 12 connected to the external electrode 20 is also end margin region 15. That is, in the end margin region 15, a set of the internal electrode layers 12 connected to one external electrode face each other without sandwiching the internal electrode layer connected to the other external electrode. The capacity region 14 is a region that generates an electrical capacitance in the multilayer ceramic capacitor 100. The end margin region 15 does not generate an electrical capacitance in the multilayer ceramic capacitor 100.

Figure 3A:
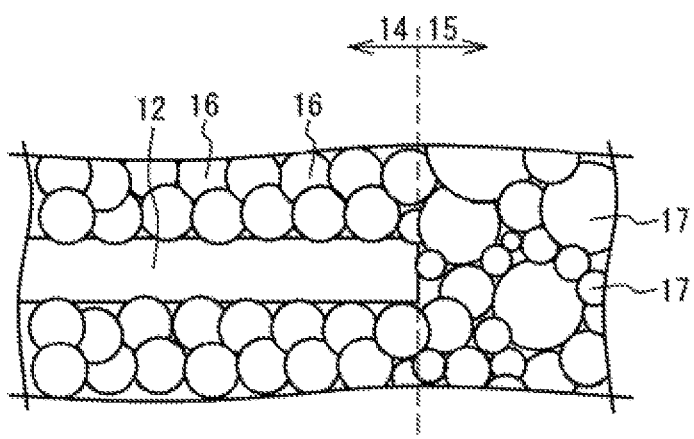
FIG. 3A illustrates grain size distribution of an end margin region.
Figure 3B:
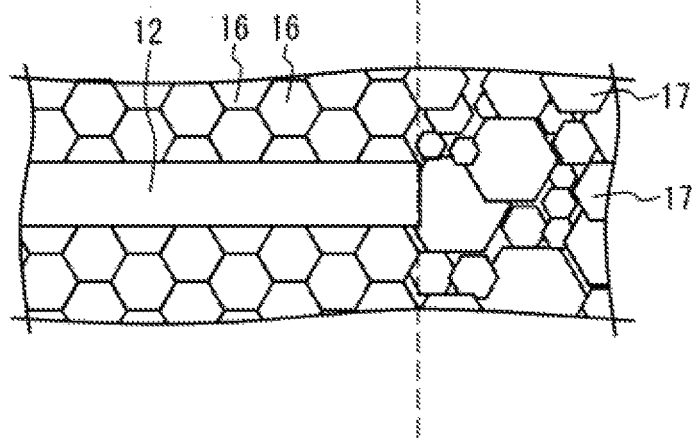
FIG. 3B illustrates grain size distribution of a capacity region.

The dielectric layer 11 is formed by baking raw material powders of which a main component is a ceramic material. Therefore, the dielectric layer 11 includes a plurality of crystal grains. In the embodiment, grain size distribution of the ceramic material in the capacity region 14 is different from that in the end margin region 15. In concrete, as illustrated in FIG. 3A or FIG. 3B, the grain size distribution of the crystal grains of a ceramic material 17 in the end margin region 15 is wider than that of a ceramic material 16 in the capacity region 14. That is, a maximum crystal grain diameter of the ceramic material 17 in the end margin region 15 is larger than that of the ceramic material 16 in the capacity region 14. A minimum crystal grain diameter of the ceramic material 17 in the end margin region 15 is smaller than that of the ceramic material 16 in the capacity region 14.

However, crystal grains having an excessively small diameter or crystal grains having an excessively large diameter may mix with the capacity region 14 of which the grain size distribution is narrow. And so, in the embodiment, a D20% diameter and a D80% diameter of accumulated grain size distribution with a volume standard are used as indices of the grain size distribution of crystal grains. In concrete, the D20% diameter of the ceramic material 17 of the end margin region 15 is smaller than the D20% diameter of the ceramic material 16 of the capacity region 14. The D80% diameter of the ceramic material 17 of the end margin region 15 is larger than the D80% diameter of the ceramic material 16 of the capacity region 14. Alternatively, 1/(log D80–log D20) of the ceramic material 16 of the capacity region 14 is larger than 1/(log D80–log D20) of the ceramic material 17 of the end margin region 15.

When the grain size distribution of the crystal grains of the ceramic material 17 in the end margin region 15 is widened, a region between a large crystal grain and another large crystal grain can be filled with small crystal grains. And a filling rate of the end margin region 15 can be enlarged. In this case, a mechanical strength of the end margin region 15 can be enlarged. It is possible to reduce the difference between an average crystal grain diameter of the capacity region 14 and an average crystal grain diameter of the end margin region 15, when the D20% diameter of the ceramic material 17 of the end margin region 15 is smaller than the D20% diameter of the ceramic material 16 of the capacity region 14 and the D80% diameter of the ceramic material 17 of the end margin region 15 is larger than the D80% diameter of the ceramic material 16 of the capacity region 14, or 1/(log D80–log D20) of the ceramic material 16 of the capacity region 14 is larger than 1/(log D80–log D20) of the ceramic material 17 of the end margin region 15. It is therefore possible to reduce a difference between mechanical strengths of the capacity region 14 and the end margin region 15. Accordingly, the multilayer ceramic capacitor 100 of the embodiment can suppress the structure defect such as the delamination or the crack. In the embodiment, the average crystal grain diameter is a D50% diameter (median diameter) in an accumulated grain size distribution with a volume standard.

From a viewpoint of stress suppression between the capacity region 14 and the end margin region 15, it is preferable that an average crystal grain diameter of the ceramic material 17 of the end margin region 15 is closer to that of the ceramic material 16 of the capacity region 14. For example, it is preferable that the average crystal grain diameter of the ceramic material 17 of the end margin region 15 is within ±10% of that of the ceramic material 16 of the capacity region 14.

From a viewpoint of multilayer structure, it is preferable that a distance between the internal electrode layer 12 connected to the external electrode 20 and the internal electrode layer 12 connected to the external electrode 30 is 2.5 μm or less. That is, it is preferable that a thickness of the dielectric layer 11 between the internal electrode layer 12 connected to the external electrode 20 and the internal electrode layer 12 connected to the external electrode 30 is 2.5 μm or less.

Figure 4:
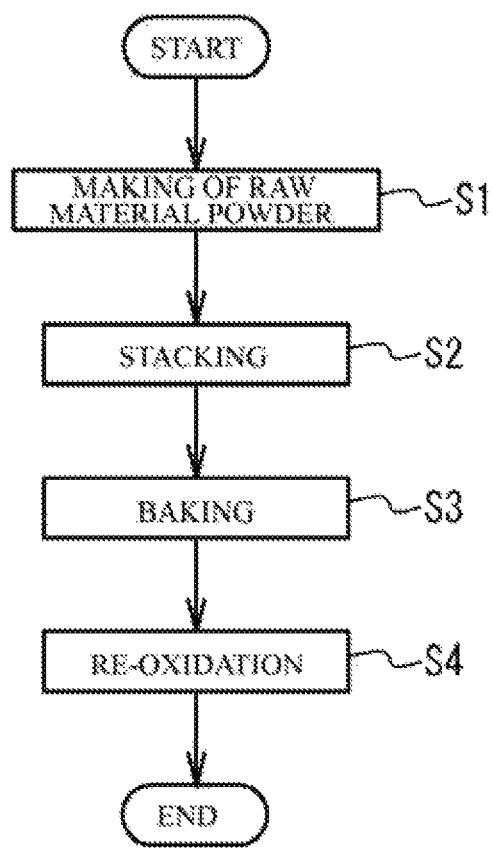
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

Making process of raw material powder

An additive compound may be added to a ceramic powder that is a main component of the dielectric layer 11, in accordance with purposes. The additive compound may be an oxide of Mg (magnesium), Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni, Li (lithium), B (boron), Na (sodium), K (potassium) and Si (silicon) or glass. For example, a compound including an additive compound is added to a ceramic material powder and is calcined. And grains of a ceramic material of which a primary diameter is 0.05 μm to 0.30 μm are obtained. Next, an additive compound and an organic solvent are added to the resulting grains of the ceramic material. And, a slurry is obtained. The resulting slurry is dried and is crushed by a bead mill so that a BET specific surface area becomes 5 $m^2$/g to 20 $m^2$/g.

Stacking Process

Next, a binder such as polyvinyl butyral (PVB) resin, an organic solvent such as ethanol or toluene, and a plasticizer such as dioctyl phthalate (DOP) are added to the resulting first ceramic grains and wet-blended. With use of the resulting slurry, a strip-shaped dielectric green sheet with a thickness of 1.2 μm or less is coated on a base material by, for example, a die coater method or a doctor blade method, and then dried.

Then, a pattern of the internal electrode layer 12 is provided on the surface of the dielectric green sheet by printing a metal conductive paste including an organic binder with use of screen printing or gravure printing. A plurality of the patterns are alternately extracted to the pair of external electrodes. The metal conductive paste includes the main component metal of the internal electrode layer 12. It is preferable that a primary diameter of the metal conductive paste is approximately 0.05 μm to 0.30 μm. It is more preferable that the primary diameter is less than 0.15 μm. As a co-material, the conductive paste may evenly include a ceramic material of which an average grain diameter is 50 nm or less.

A paste of a second ceramic grain is printed on a peripheral area of the dielectric green sheet where the metal conductive paste is not printed. It is preferable that the second ceramic grain is the same as the ceramic grain used for the dielectric green sheet. However, the second ceramic grain may be different from the ceramic grain used for the dielectric green sheet. It is preferable that the second ceramic grain is designed so as to concentrate earlier than the first ceramic grain of the dielectric green sheet. For example, an amount of Mn or Si added to the second ceramic grain is adjusted with respect to the first ceramic grain. With the processes, a pattern formation sheet is formed.

Then, the pattern formation sheet is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations.

Cover sheets, which are to be the cover layers 13, are stacked on the stacked pattern formation sheets and under the stacked sheets. The resulting compact is cut into a predetermined size (for example, 1.0 mm×0.5 mm). Thus, a ceramic multilayer structure having a rectangular parallelepiped shape is obtained.

The grain size of the second ceramic grains is adjusted in the resulting multilayer structure so that the D20% diameter of the first ceramic grains and the second ceramic grains on the above-mentioned peripheral area is smaller than the D20% diameter of the first ceramic grains between the metal conductive pastes and the D80% diameter of the first ceramic grains and the second ceramic grains on the above-mentioned peripheral area is larger than the D80% diameter of the first ceramic grains between the metal conductive pastes, or 1/(log D80–log D20) of the first ceramic grains between the metal conductive pastes is larger than 1/(log D80–log D20) of the first ceramic grains and the second ceramic grains on the above-mentioned peripheral area.

Moreover, it is preferable that the grain diameter of the second ceramic grains is adjusted so that an average grain diameter of the first ceramic grains and the second ceramic grains on the peripheral area is within ±10% of an average grain diameter of the first ceramic grains between the metal conductive pastes. It is more preferable that the grain diameter of the second ceramic grains is adjusted so that the average grain diameter of the first ceramic grains and the second ceramic grains on the peripheral area is within ±5% of the average grain diameter of the first ceramic grains between the metal conductive pastes.

Baking Process

The binder is removed from the resulting ceramic multilayer structure in $N_2$ atmosphere of a temperature range of 250 degrees C. to 500 degrees C. After that, the resulting ceramic multilayer structure is baked for ten minutes to 2 hours in a reductive atmosphere in a temperature range of 1100 degrees C. to 1300 degrees C. Thus, each compound of the dielectric green sheet is sintered and grown into grains. In this manner, it is possible to manufacture the multilayer ceramic capacitor 100 that has the multilayer chip 10 having the multilayer structure in which the sintered dielectric layers 11 and the sintered internal electrode layers 12 are alternately stacked and has the cover layers 13 formed as outermost layers of the multilayer chip 10 in the stack direction.

Re-Oxidizing Process

After that, a re-oxidizing process may be performed in $N_2$ gas atmosphere in a temperature range of 600 degrees C. to 1000 degrees C.

With the manufacturing method in accordance with the embodiment, the grain size distribution of the crystal grains of the ceramic material 17 in the end margin region 15 is widened. Thus, a region between large crystal grains can be filled with small crystal grains. And it is possible to enlarge the filling rate of the end margin region 15. In this case, the mechanical strength of the end margin region 15 is enlarged. And, the D20% diameter of the ceramic material 17 of the end margin region 15 is smaller than the D20% diameter of the ceramic material 16 of the capacity region 14, and the D80% diameter of the ceramic material 17 of the end margin region 15 is larger than the D80% diameter of the ceramic material 16 of the capacity region 14. Alternatively, 1/(log D80–log D20) of the ceramic material 16 of the capacity region 14 is larger than 1/(log D80–log D20) of the ceramic material 17 of the end margin region 15. In this case, it is possible to reduce the difference between the average crystal grain diameter of the capacity region 14 and the average crystal grain diameter of the end margin region 15. Thus, it is possible to reduce the difference between the mechanical strength of the capacity region 14 and the mechanical strength of the end margin region 15. It is therefore possible to suppress the structure defect such as the delamination, the crack or the like.

EXAMPLES

The multilayer ceramic capacitors in accordance with the embodiment were made and the property was measured.

Examples 1 to 8

$Ho_2O_3$, $MnCO_3$, $V_2O_5$ and $SiO_2$ were added to barium titanate of which a primary diameter is approximately 0.1 μm. An organic solvent was added to the resulting barium titanate. Thus, slurry was obtained. The slurry was dried. After that, the dried slurry was crushed by a bead mill until a BET specific surface area becomes 12 $m^2$/g. A PVB binder was added to the slurry and was kneaded. After that, the resulting slurry was coated on a PET film and was dried. Thereby, a dielectric green sheet having a thickness of 1 μm was formed.

Next, a metal conductive paste of which a main component was nickel having a primary diameter of approximately 0.1 μm was formed on the dielectric green sheet by a screen printing. Next, a paste that includes barium titanate as a main component and has grain size distribution wider than that of the dielectric green sheet was printed on the surrounding area of dielectric green sheet where the metal conductive paste was not printed. Thus, a pattern formation sheet was formed.

A plurality of pattern formation sheets were stacked. And, a multilayer chip having a 1005 shape (length: 1.0 mm, width: 0.5 mm, height: 0.5 mm) and has 500 layers was obtained. Next, a binder was removed from the multilayer chip at approximately 400 degrees C. in a humidified $N_2$ gas atmosphere. After that, the multilayer chip was baked at approximately 1250 degrees C. in a humidified mixed gas of $N_2$ and $H_2$. Moreover, a re-oxidation process was performed at approximately 900 degrees C. in $N_2$ atmosphere. Thus, a multilayer ceramic capacitor was obtained.

Comparative Examples 1 to 6

In comparative examples 1 to 6, the grain size distribution of the crystal grains in the capacity region 14 was equal to that in the end margin region 15. Alternatively, the grain size distribution of the crystal grains in the capacity region 14 was wider than that in the end margin region 15. Other manufacturing conditions were the same as those of the examples 1 to 8.

Analysis

An estimation of structure defect (a crack and a delamination) and a confirmation of a crystal grain diameter of an internal structure were performed with respect to the multilayer ceramic capacitors. FIG. 5 illustrates results. A scale factor of a scanning electron microscope or a transmission electron microscope was adjusted so that a single image includes 80 to 150 crystal grains. A plurality of images were obtained so that a total was 400 crystal grains or more. Feret diameters measured with respect to a total number of the crystal grains on the images were used as the crystal grain diameters. An average crystal grain diameter was an average of the measured crystal grain diameters. A column of "grain size distribution" of FIG. 5 indicates "circle" in a case where 1/(log D80–log D20) of the ceramic material 16 of the capacity region 14 is larger than 1/(log D80–log D20) of the ceramic material 17 of the end margin region 15 and indicates "cross" in a case where 1/(log D80–log D20) of the ceramic material 16 of the capacity region 14 is equal to or smaller than 1/(log D80–log D20) of the ceramic material 17 of the end margin region 15. A column of "difference of average crystal grain diameters" indicates a ratio of the average crystal grain diameter of the end margin region 15 with respect to the average crystal grain diameter of the capacity region 14. Columns of "delamination defect" and "crack defect" indicate a ratio of the delamination defect or the crack defect of 200 samples.

As illustrated in FIG. 5, in the examples 1 to 8, the delamination defect and the crack defect were suppressed. This is because the grains size distribution of the crystal grains of the ceramic material 17 of the end margin region 15 was widened, a region between large crystal grains was filled with small crystal grains, the filling rate of the end margin region 15 was enlarged, and the mechanical strength of the end margin region 15 was enlarged. Moreover, this is because the difference between the average crystal grain diameter of the capacity region 14 and the average crystal grain diameter of the end margin region 15 was reduced, and the difference between the mechanical strength of the capacity region 14 and the mechanical strength of the end margin region 15 was reduced, because the D20% diameter of the ceramic material 17 of the end margin region 15 was smaller than the D20% diameter of the ceramic material 16 of the capacity region 14 and the D80% diameter of the ceramic material 17 of the end margin region 15 was larger than the D80% diameter of the ceramic material 16 of the capacity region 14, or 1/(log D80–log D20) of the ceramic material 16 of the capacity region 14 was larger than 1/(log D80–log D20) of the ceramic material 17 of the end margin region 15.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a first external electrode and a second external electrode;
   a plurality of internal electrode layers that are alternately connected to the first external electrode and the second external electrode and are stacked; and
   a plurality of dielectric layers each of which is arranged between the plurality of internal electrode layers, the plurality of dielectric layers including a ceramic material as a main component,
   wherein a D20% diameter of the ceramic material of an end margin region, in which internal electrode layers connected to one of the first external electrode and the second external electrode face with each other and does not face with internal electrode layers connected to the other, is smaller than another D20% diameter of the ceramic material of a capacity region in which internal electrode layers connected to different external electrodes face with each other and a D80% diameter of the ceramic material of the end margin region is larger than another D80% diameter of the ceramic material of the capacity region, or 1/(log D80−log D20) of the ceramic material of the capacity region is larger than 1/(log D80−log D20) of the ceramic material of the end margin region.

2. The multilayer ceramic capacitor as claimed in claim 1, wherein an average crystal grain diameter of the ceramic material of the end margin region is within ±10% of another average crystal grain diameter of the ceramic material of the capacity region.

3. The multilayer ceramic capacitor as claimed in claim 2, wherein a distance between internal electrode layers connected to the different external electrodes is 2.5 μm or less.

4. The multilayer ceramic capacitor as claimed in claim 3, wherein the ceramic material is barium titanate.

5. The multilayer ceramic capacitor as claimed in claim 2, wherein the ceramic material is barium titanate.

6. The multilayer ceramic capacitor as claimed in claim 1, wherein a distance between internal electrode layers connected to the different external electrodes is 2.5 μm or less.

7. The multilayer ceramic capacitor as claimed in claim 6, wherein the ceramic material is barium titanate.

8. The multilayer ceramic capacitor as claimed in claim 1, wherein the ceramic material is barium titanate.

9. A manufacturing method of a multilayer ceramic capacitor comprising:
providing a metal conductive paste on a green sheet including first ceramic grains;
forming a layer unit by providing second ceramic grains on a peripheral area around the metal conductive paste on the green sheet;
baking a multilayer structure that is formed by stacking the layer unit,
wherein a grain diameter of the second ceramic grains is adjusted so that, in the multilayer structure, a D20% diameter of the first ceramic grains and the second ceramic grains of the peripheral area is smaller than another D20% diameter of the first ceramic grains between a pair of the metal conductive paste and a D80% diameter of the first ceramic grains and the second ceramic grains of the peripheral area is larger than another D80% diameter of the first ceramic gains between the pair of the metal conductive paste, or 1/(log D80−log D20) of the first ceramic grains between the pair of the metal conductive paste is larger than 1/(log D80−log D20) of the first ceramic grains and the second ceramic grains of the peripheral area.

10. The manufacturing method as claimed in claim 9, wherein the grain diameter of the second ceramic grains is adjusted so that an average grain diameter of the first ceramic grains and the second ceramic grains of the peripheral area is within ±10% of an average grain diameter of the first ceramic grains between the pair of the metal conductive paste.

11. The method as claimed in claim 10, wherein a thickness of the first ceramic grains between the pair of the metal conductive paste after the baking is 2.5 μm or less.

12. The method as claimed claim 11, wherein the first ceramic grains and the second ceramic grains are barium titanate.

13. The method as claimed claim 10, wherein the first ceramic grains and the second ceramic grains are barium titanate.

14. The method as claimed in claim 9, wherein a thickness of the first ceramic grains between the pair of the metal conductive paste after the baking is 2.5 μm or less.

15. The method as claimed claim 14, wherein the first ceramic grains and the second ceramic grains are barium titanate.

16. The method as claimed claim 9, wherein the first ceramic grains and the second ceramic grains are barium titanate.

* * * * *